UNITED STATES PATENT OFFICE.

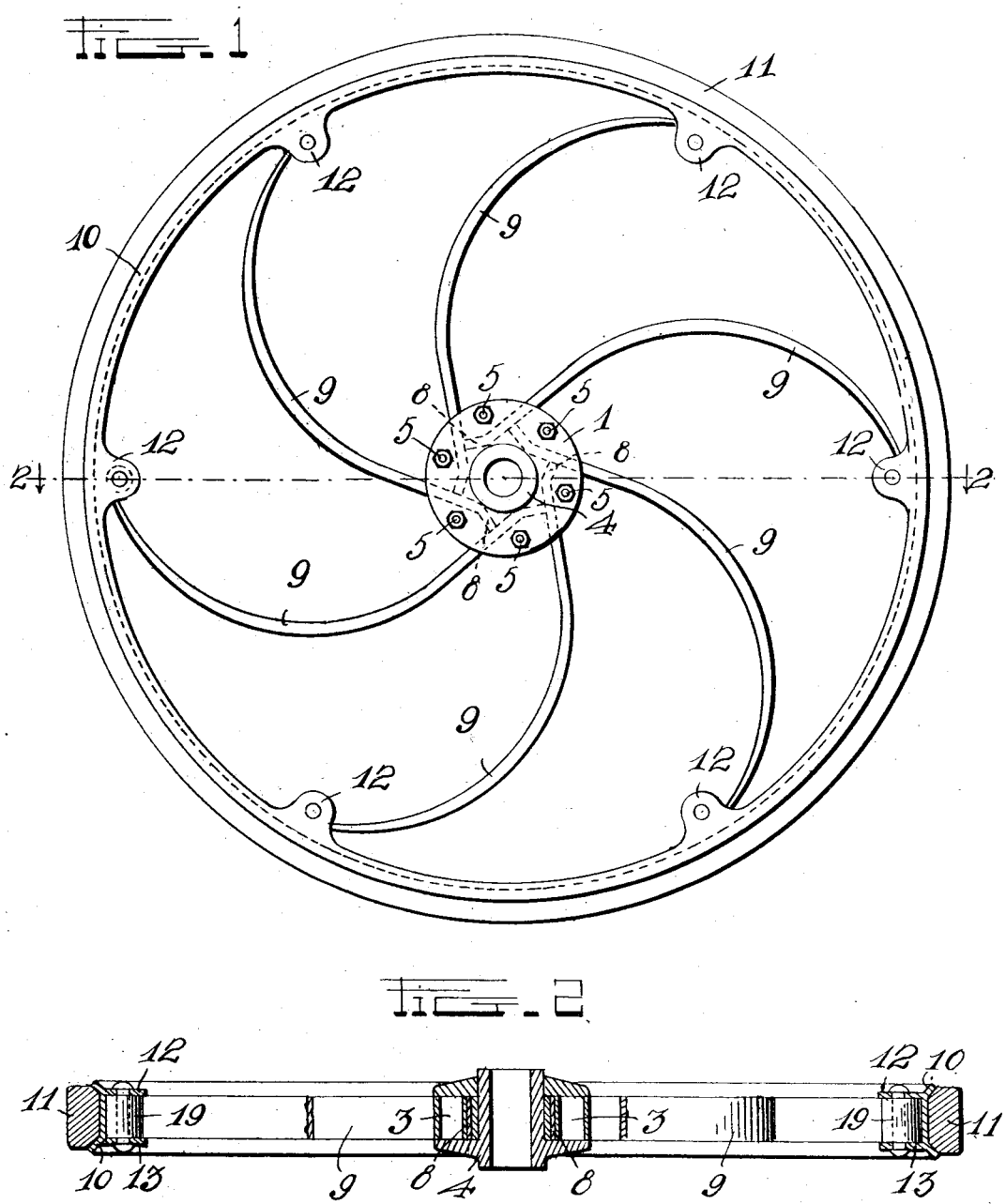

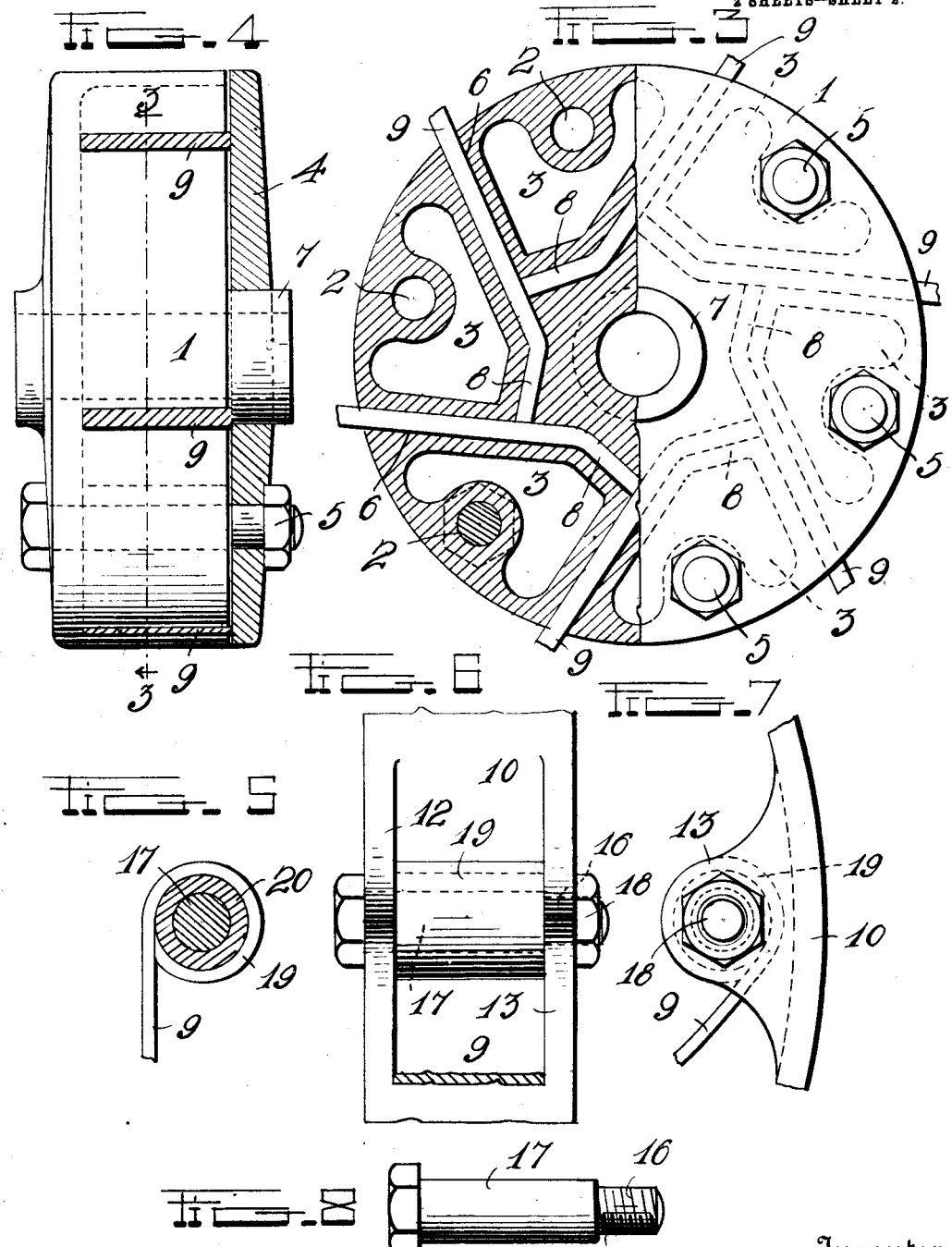

IRA J. MERRILL, OF PORTLAND, OREGON, ASSIGNOR OF ONE-HALF TO C. A. BENBOW, OF PORTLAND, OREGON.

SPRING-WHEEL.

1,039,311.  Specification of Letters Patent.   Patented Sept. 24, 1912.

Application filed May 5, 1910, Serial No. 559,461. Renewed December 7, 1911. Serial No. 664,192.

*To all whom it may concern:*

Be it known that I, IRA J. MERRILL, citizen of the United States, residing at Portland, in the county of Multnomah and State of Oregon, have invented certain new and useful Improvements in Spring-Wheels; and I do declare the following to be a full, clear, and exact description of the invention, such as will enable others skilled in the art to which it appertains to make and use the same.

This invention relates to an improvement in spring wheels.

The object of the invention is to provide a simply constructed and efficient spring wheel in which the spokes are firmly held at the hub and provided with a movable joint at the tire connection thereto to provide movement which takes place in the elastic action of the spring steel spoke.

Another object is to provide a spring wheel which is perfectly rigid with regard to dishing.

With these and other objects in view, the invention consists of certain novel features of construction, combination and arrangement of parts as will be more fully described and particularly pointed out in the appended claim.

In the accompanying drawings: Figure 1 is a side elevation of a wheel constructed in accordance with this invention; Fig. 2 is a horizontal section taken on the line 2—2 of Fig. 1; Fig. 3 is a side elevation partly in section on an enlarged scale of the hub taken on the line 3—3 of Fig. 4; Fig. 4 is an edge view of the hub with the spokes shown in section; Fig. 5 is a detail sectional view taken through the end of a spring spoke at its connection with the tire; Fig. 6 is a detail bottom plan view on an enlarged scale showing the connection of one of the spring spokes with the tire; Fig. 7 is a side view thereof; and, Fig. 8 is a side elevation of one of the tire bolts detached.

In the embodiment illustrated a hub 1 is preferably cast in one piece having bolt holes 2 extending longitudinally therethrough preferably near its periphery and with portions cut out as shown at 3 to render the hub lighter. A hub cap 4 is provided with a plurality of bolt holes arranged to register with the holes 2 in the body of the hub and through which the clamping bolts as 5 are designed to pass for clamping the spokes in the hub as will be hereinafter described. This hub 1 is provided with a plurality of spoke channels 6 which extend in a plane tangentially to the axle bushing 7, the inner ends 8 of said channels being formed at an obtuse angle and communicate with the portion 6 of the channels to provide for the inner end of each spoke resting firmly against the adjacent spoke as is shown in Fig. 3 which prevents any inward movement of the spokes when acted upon by the pressure of the load being carried. Any desired number of these channels may be provided, six being here shown. These channels are preferably made slightly shallower than the width of the spokes to be inserted therein to permit the cap 4 to be drawn firmly against the edges of the spokes and insuring their being suitably held rigidly in place against any sidewise movement. A plurality of flat spring steel spokes 9 which preferably taper in thickness from their inner toward their outer ends have their inner ends bent at an obtuse angle to fit within the channels of the hub and this bend in the inner ends of the spokes and the channels in which they are inserted prevents any outward movement of the spokes should a pull be exerted in that direction and when the hub cap 4 is clamped into operative position these spokes are held absolutely rigid the channels being cored sufficiently close to provide a positive fitting of the spoke but in case the openings in the channels should become enlarged from any reason the spoke may be secured rigidly therein by using hot babbitt after it has been placed in position. It will be obvious that when it is desired to renew one of the spokes it is only necessary to unclamp the cap 4 and slip the spoke out edgewise supplying the new one in its place and then reclamping the cap.

The tire 10 of this improved wheel may be of any suitable or desired form and is preferably provided with annular flanges on the periphery thereof between which is mounted a rubber tire 11. This tire 10 is provided around its inner face with a plurality of laterally spaced apertured ears as 12 and 13 to which the outer ends of the spring spokes 9 are designed to be connected. The aperture in one of the laterally spaced lugs or ears 12 or 13 is preferably screw threaded to receive the reduced threaded end

16 of the tire bolt as 17 and this threaded end projects beyond the outer face of the lug having the screw threaded aperture and is provided with a nut as 18 which serves the purpose of a lock nut.

The outer ends of the spokes 9 are bent to form eyes as 19 which encircle brass bushings as 20 which are mounted on the bolts 17 between the inner faces of the lugs 12 and 13 whereby the outer ends of these flat spring spokes are pivotally connected with the tire.

From the construction shown and described it will be obvious that the flat spring wheel spokes are held perfectly rigid against lateral movement and all danger of their wearing loose at any point except at their connection with the tire is avoided and at this point the parts may be easily renewed and replaced this construction also providing flexibility in line with the flat sides of the spokes.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

I claim as my invention:

A spring wheel comprising a hub provided with a plurality of spoke channels extending for a portion of their length in planes tangentially to the axle box thereof and having their inner ends bent outwardly at an obtuse angle and communicating with the tangentially arranged portion of the adjacent channel, a plurality of flat spring steel spokes tapering in thickness from their inner toward their outer ends with their body portions curved outwardly throughout the great part of their lengths and the inner ends of said spokes being bent to conform to the shape of the channels in the hub, the terminals of the inner ends of the respective spokes abutting against the inner faces of the adjacent spokes, means for rigidly connecting said spokes within said hub and means for pivotally connecting the outer ends of said spokes to the wheel tire.

In testimony whereof I have hereunto set my hand in presence of two subscribing witnesses.

IRA J. MERRILL.

Witnesses:
F. J. STEINNETZ,
R. W. KOCH.

---

Copies of this patent may be obtained for five cents each, by addressing the "Commissioner of Patents, Washington, D. C."